(12) United States Patent
Mallalieu et al.

(10) Patent No.: US 8,402,040 B2
(45) Date of Patent: Mar. 19, 2013

(54) METHOD AND SYSTEM TO AUTHENTICATE AN OBJECT

(75) Inventors: Mark R. Mallalieu, Nashua, NH (US); James A. Kottas, Westford, MA (US); Mohamed Lazzouni, Northborough, MA (US); Leonid Y. Shteyman, Hudson, MA (US); Jay F. Bortolussi, Andover, MA (US); Thomas M. Kuzeja, Norfolk, MA (US); Gida R. Zikas-Bernard, Newton Upper Falls, MA (US)

(73) Assignee: Morphotrust USA, Inc., Bloomington, MN (US)

( * ) Notice: Subject to any disclaimer, the term of this patent is extended or adjusted under 35 U.S.C. 154(b) by 315 days.

(21) Appl. No.: 11/208,356

(22) Filed: Aug. 19, 2005

(65) Prior Publication Data

US 2006/0074986 A1  Apr. 6, 2006

Related U.S. Application Data

(60) Provisional application No. 60/603,339, filed on Aug. 20, 2004.

(51) Int. Cl.
  *G06F 7/00* (2006.01)
  *G06F 17/30* (2006.01)
(52) U.S. Cl. ......... 707/758; 707/722; 707/736; 707/781
(58) Field of Classification Search .................. 707/736, 707/758, 781, 783, 722, 723
See application file for complete search history.

(56) References Cited

U.S. PATENT DOCUMENTS

| | | | | |
|---|---|---|---|---|
| 5,613,012 A | * | 3/1997 | Hoffman et al. | 382/115 |
| 6,128,398 A | * | 10/2000 | Kuperstein et al. | 382/118 |
| 6,218,398 B1 | | 4/2001 | Leet et al. | |
| 6,269,169 B1 | * | 7/2001 | Funk et al. | 382/100 |
| 6,496,936 B1 | * | 12/2002 | French et al. | 726/7 |
| 6,681,032 B2 | * | 1/2004 | Bortolussi et al. | 382/118 |
| 6,862,610 B2 | * | 3/2005 | Shuster | 709/217 |
| 6,952,163 B2 | * | 10/2005 | Huey et al. | 340/521 |
| 7,228,011 B1 | * | 6/2007 | Queeno | 382/305 |
| 2003/0102365 A1 | * | 6/2003 | Elderfield | 235/375 |
| 2004/0010697 A1 | * | 1/2004 | White | 713/186 |
| 2004/0093349 A1 | * | 5/2004 | Buinevicius et al. | 707/104.1 |
| 2004/0133582 A1 | * | 7/2004 | Howard et al. | 707/100 |
| 2004/0172562 A1 | * | 9/2004 | Berger et al. | 713/202 |
| 2004/0181675 A1 | * | 9/2004 | Hansen | 713/182 |

OTHER PUBLICATIONS

International Search Report for Application No. PCT/US05/29735, dated Jul. 8, 2008.

* cited by examiner

*Primary Examiner* — Kimberly Wilson
*Assistant Examiner* — Hexing Liu
(74) *Attorney, Agent, or Firm* — McCarter & English, LLP

(57) ABSTRACT

The system and methods disclosed herein validate the authenticity of a document and an individual's claimed identity. The system and method use a validation facility that is configurable to compare and match characteristics of biometric and non-biometric data presented by an individual with biometric and non-biometric data received from a request to a database or file system holding such information. The determination on the matching characteristics of the data can occur in completely automated fashion without intervention from the user, but user intervention is also possible allowing the user to review and override certain data discrepancies. The validation facility provides a user interface for use by a user to review a determination on the data analysis and instruct the validation facility to override that determination if the user determines the cause of the identity verification failure is within an acceptable criterion.

27 Claims, 7 Drawing Sheets

| C | P(D\|C) | P(~D\|C) |
|---|---|---|
| T | Xt | Yt |
| F | Yf | Xf |

Table I

| Z | P(C\|Z) | P(~C\|Z) |
|---|---|---|
| T | K | 1-K |
| F | 0 | 1 |

Table II

Fig. 6

Proofing Analysis Results

The following table shows the results of the proofing analysis.
All conflicts should be reviewed before completing the proofing process.
When you are satisfied with the results, press the Done button.

| Proofing Category | Results | |
|---|---|---|
| Name: | FAILED (Conflict) | Review... — 1030A |
| DOB: | Passed | Review... — 1030B |
| Address: | Passed | Review... — 1030C |
| Phone number: | Insufficient data | Review... — 1030D |
| Biometrics: | Passed | Review... — 1030E |
| Watchlist: | Passed | Review... — 1030F |
| Overall: | FAILED (Conflict) | Done |

*Fig. 8*

Proofing Analysis Results

The following table shows the results of the proofing analysis.
All conflicts should be reviewed before completing the proofing process.
When you are satisfied with the results, press the Done button.

| Proofing Category 1010 | Results 1020 | | |
|---|---|---|---|
| Name: | Passed (with Override) | Review... | 1030A |
| DOB: | Passed | Review... | 1030B |
| Address: | Passed | Review... | 1030C |
| Phone number: | *Insufficient data* | Review... | 1030D |
| Biometrics: | Passed | Review... | 1030E |
| Watchlist: | Passed | Review... | 1030F |
| 1040 | | | |
| Overall: | PROOFING PASSED | Done | 1050 |

METHOD AND SYSTEM TO AUTHENTICATE AN OBJECT

RELATED APPLICATIONS

This application claims the benefit of U.S. Provisional Patent Application No. 60/603,339, filed Aug. 20, 2004, and entitled "Method and System to Authenticate an Object".

BACKGROUND OF INVENTION

The present invention generally relates to a system and method for authenticating an object, and more particularly relates to a system and method to analyze biometric and non-biometric data associated with an individual to authenticate the identity of the individual.

Historically, identity verification of an individual has relied on a human operator to visually compare in person, identification features on a document presented by the individual with the individual or with other documents presented by the individual. Such identification features often included a signature, an image affixed to a document, an address, and a date of birth, and the like. The result of the visual comparison between the individual and the document was often accurate so long as the presented document was genuine. The human operator, unless clearly obvious, had little opportunity to determine if the document was tampered with or a forgery. Such an identity verification process places a significant burden on the human operator for he or she alone has the responsibility to verify the identity of the individual and verify the authenticity of the document presented by the individual.

One conventional method for assisting the human operator in verifying or authenticating the identity of an individual and authenticate any documents presented by the individual in support of his or her claimed identity is the use of machine readable identification features embedded or formed as part of the document. The machine readable identification features of the document provide the human operator with the ability to verify the authenticity of the document or have the information encoded in the machine readable format displayed on a display device for comparison with the individual or human readable identification features on the document. Such machine readable identification features can include smart chips, barcodes or matrix code symbologies, magnetic mediums, a radio frequency identification feature and the like. Additionally, the human operator can use either the machine readable identification features of the document, the human readable identification features of the document or both, to query a database such as a watchlist and compare the identity information contained in the document with that of the database to determine the validity or authenticate the identity of the individual.

The machine readable identification features of a document allow the human operator to verify the individual's claimed identity corresponds with that of the document or with that of a database. The use of the machine readable identification features is an improvement over the in person visual comparison between human readable features on the document and the presenter of the document. Nevertheless, the human operator determining the authenticity of the identity claim and the individual's presented document must analyze and compare the machine readable identity features read from the document and with the human readable identity features of the document or with the results of the database query and determine based on his or her analysis if the identity of the individual is authentic.

One problem with the conventional use of the machine readable identity features and the human readable identify features of a document, and the result of a database query is the sole reliance on a human operator to analyze, typically in real time fashion, the data from the various data sources and make a determination to the authenticity of the individual's identity and the authenticity of the document presented. In similar fashion to the historical methodology of relying solely on the human operator to compare an image or signature on a document with the individual or a signature sample from the individual to authenticate the identity of an individual, the additional use of machine readable identification features places a significant burden on the individual performing the identity authentication to identify conflicts in the data, determine if the presented identity document is a forgery or tampered with and, in turn, grant or deny the privileges the presenter of the identity document is requesting. Such methodologies tend to be time consuming requiring identity verification to take place one individual at a time and is further prone to human errors.

Moreover, with identity fraud, one of the fastest growing crimes, along with an increase in security requirements promulgated by various government agencies and standard organizations, it is desirable to have a robust system and methods for performing identity verification that reduces the sole reliance on a human operator to verify the authenticity of the presented document and the individuals identity while minimizing the exposure of the individuals private data to the operator.

SUMMARY OF INVENTION

The present invention addresses the above-described limitations of verifying the identity of an individual and authenticating documents presented by the individual in support of his or her claimed identity. The present invention provides an approach to improve the results of verifying the identity of an individual and authenticating the identity documents presented by the individual in support thereof. The improved results are provided in part by a validation facility architecture which allows the use of in-house and third party biometric, demographic, and biographic data, and, in a configurable manner, analyze the data from the various data sources to increase the confidence level in a result indicating a determination on the authenticity of the identity claimed by the individual.

Further, the present invention improves upon the conventional identify verification processes by providing methods and function for handling data errors and other data abnormalities associated with data sources such as in-house databases, third party databases, and data services that provide data, data validation, or both and by providing methods and functions to calculate an authentication score for the individual that minimizes the effects of such errors on the score to provide an improved confidence level that an individual's claimed identity is valid. Hence, for example, missing data or incomplete data from an individual's address history is taken into account by the validation facility to provide a determination on the authenticity of an individual's identity. Thus, the present invention beneficially leverages both automatic machine judgment and human judgment to authenticate identity documents and determine if the claimed identity of an individual is valid.

In one embodiment of the present invention, a method for performing identity verification of an individual is disclosed. The method includes the steps of receiving data from a number of data sources and analyzing the received data to verify the identity of the individual. Performance of the method can automatically represent a result of analyzing the received data with one or more indicators. The method can include the step of determining if the data received from one of the plurality of data sources is valid before analyzing the received data to verify the identity of the individual.

The data received from the data sources can include biometric data, geographic data, biographic data, or any other data type suitable for use in verifying the identity of the individual. The data sources can include a document presented by the individual, the individual, a database, a file system, or any combination thereof.

Performance of the method can determine if the document is a genuine document, a counterfeit document, or a tampered document. Performance of the method can construct a query to extract data from one of the data sources.

In another embodiment of the present invention, a method for authenticating an individual is disclosed. The method includes the steps of receiving personal information from the individual, querying a first database holding biometric related information, querying a second database holding non-biometric information, and determining the authenticity of the individual based on an analysis of the personal information, a response to the query of the first database, and a response to the query of the second database.

The method can include the steps of querying a third database holding non-biometric information and determining authenticity of the individual based on an analysis of the personal information, a response to the query of the first database, a response to the query of the second database, and a response to the query of the third database.

The method allows determination of the authenticity of the individual in real-time fashion. The method also allows the determination of the authenticity of the individual in batch fashion.

In one embodiment of the present invention, the analysis of the personal information, a response to the query of the first database, and a response to the query of the second database generates for each of a plurality of data categories a result having at least two states. In one embodiment of the present invention, the analysis of the personal information, a response to the query of the first database, and a response to the query of the second database includes an analysis of information received from the individual, information from the first database, and information from the second database. For each of the data categories the analysis can determine a validation confidence score. The validation confidence score representing a level of certainty that the data associated with a data category is true.

In one embodiment of the present invention, the analysis of the personal information, the response to the query of the first database, and the response to the query of the second database includes a rule based analysis of at least one of the personal information, the response to the query of the first database or the response to the query of the second database. The rule based analysis accesses a set of rules that define acceptable data conditions, unacceptable data conditions, and data conditions that require taking an action to notify a party interested in the authenticity the individual.

In another embodiment of the present invention, a system for validating one or more objects is disclosed. The system includes a first computational device and a validation facility. The first computational device is configurable to receive information from the one or more objects. The information received includes biometric data and non-biometric data. The validation facility is configurable to validate the information received from the one or more objects. The validation facility is configurable to analyze the information received from the one or more objects and provide a plurality of outputs representing a determination on the validity of the one or more objects, with each of the outputs having at least two states.

The system can include an interface configurable to receive a request for data from the validation facility and forward the request in a format understandable by a data source identified in the request. Further, the validation facility is extensible and configurable to add or remove components to add or remove functionality from the validation facility.

The system can include a storage device holding business rules that define what data conditions the validation facility should accept, what data conditions the validation facility should reject, and what data conditions the validation facility should take an action on to notify a party interested in validating the one or more objects.

The system can include an image acquisition apparatus, a document reader apparatus, a document scanner apparatus, a magnetic stripe reader apparatus, a bar code reader apparatus, a fingerprint reader apparatus, a smart chip reader apparatus, and other like apparatuses to collect and receive data relating to the identity of an individual. The system can also include a second computational device to receive information from the one or more objects. The information received by the second computation device includes biometric and non-biometric data of an individual. In one embodiment of the present invention, the second computational device is configured as a server and is configured to control the operation of the validation facility.

In one embodiment of the present invention, a method for authenticating an individual is disclosed. The method includes the steps of receiving personal information and biometric related information of an individual, requesting an analysis of the personal information and the biometric related information to authenticate the individual, and receiving a result of the analysis. The result provides a determination on the authenticity of the individual.

The method can include the steps of receiving a document from the individual and determining if the document is a valid document. The document provides identity information of the individual.

Performance of the method can display a representation of the result of the analysis. The result can have two or more states.

The analysis is performable on a number of data categories. The data categories are selectable from categories such as, data categories based on personal information including but not limited to biographic data, demographic data, biometric data, data categories that include watchlist data for identifying undesirable individuals, data categories relating to itineraries, data categories relating to transactional based data, and other data categories. The analysis can provide a result for each data category.

The method can include the step of providing an audio representation of the result. The method can include the step of saving at least one of the analyses or the result in a data structure. The method can also include the step of creating a profile for the individual. The profile can include an identity profile for the individual indicating whether the individual is entitled to the identity.

In one embodiment of the present invention, a computer readable medium holding computer readable instructions for performing a method to verify a characteristic of an individual is disclosed. The medium holds instructions for performing the steps of receiving data from a number of data sources and analyzing the received data to verify the identity of the individual. Execution of the instructions held by the medium can automatically represent a result of analyzing the received data with one or more indicators. The medium can include instructions for determining if the data received from one of the plurality of data sources is valid before analyzing the received data to verify the identity of the individual.

The data received from the data sources can include biometric data, geographic data, biographic data, or any other data type suitable for use in verifying the identity of the individual. The data sources can include a document presented by the individual, the individual, a database, a file system, or any combination thereof.

Execution of the instructions held by the medium can determine if the document is a genuine document, a counterfeit document, or a tampered document. Execution of the instructions held by the medium can construct a query to extract data from one of the data sources.

In another embodiment of the present invention, a computer readable medium holding computer executable instructions for performing a method for authenticating an individual is disclosed. The medium holds instructions defining the steps of receiving personal information from the individual, querying a first database holding biometric related information, querying a second database holding non-biometric information, and determining the authenticity of the individual based on analysis of the personal information, a response to the query of the first database, and a response to the query of the second database.

The medium can include instructions defining the steps of querying a third database holding non-biometric information and determining authenticity of the individual based on analysis of the personal information, a response to the query of the first database, a response to the query of the second database, and a response to the query of the third database.

Execution of the instructions held by the medium allows for the determination of the authenticity of the individual in real-time fashion. Execution of the instructions held by the medium also allows for the determination of the authenticity of the individual in batch fashion.

In one embodiment of the present invention, the analysis of the personal information, a response to the query of the first database, and a response to the query of the second database generates for each of a plurality of data categories a result having at least two states. In one embodiment of the present invention, the analysis of the personal information, a response to the query of the first database, and a response to the query of the second database includes an analysis of information received from the individual, information from the first database, and information from the second database. For each of the data categories the analysis can determine a validation confidence score. The validation confidence score representing a level of certainty that the data associated with a data category is true.

In one embodiment of the present invention, the analysis of the personal information, the response to the query of the first database, and the response to the query of the second database includes a rule based analysis of at least one of the personal information, the response to the query of the first database or the response to the query of the second database. The rule based analysis accesses a set of rules that define acceptable data conditions, unacceptable data conditions, and data conditions that require taking an action to notify a party interested in the authenticity the individual.

In one embodiment of the present invention, a computer readable medium holding computer executable instructions for performing a method in a proofing system to authenticate an individual is disclosed. Execution of the instructions held by the medium instructs the system to perform the steps of receiving personal information and biometric related information of an individual, requesting an analysis of the personal information and the biometric related information to authenticate the individual, and receiving a result of the analysis. The result provides a determination on the authenticity of the individual.

The medium can hold instructions to instruction the system to perform the steps of receiving a document from the individual and determining if the document is a valid document. The document provides identity information of the individual.

Execution of the instructions held by the medium can display a representation of the result of the analysis. The result can have two or more states.

The analysis is performable on a number of data categories. The data categories are selectable from categories such as, data categories based on personal information including but not limited to biographic data, demographic data, biometric data, data categories that include watchlist data for identifying undesirable individuals, data categories relating to itineraries, data categories relating to transactional based data, and other data categories. The analysis can provide a result for each data category.

The medium can hold instructions for instructing the system to perform the step of providing an audio representation of the result. The medium can hold instructions for instructing the system to perform the step of saving at least one of the analyses or the result in a data structure. The medium can hold instructions for instructing the system to perform the step of creating a profile for the individual. The profile can include an identity profile for the individual indicating whether the individual is entitled to the identity.

BRIEF DESCRIPTION OF DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale show relative dimensions.

Figure 6:
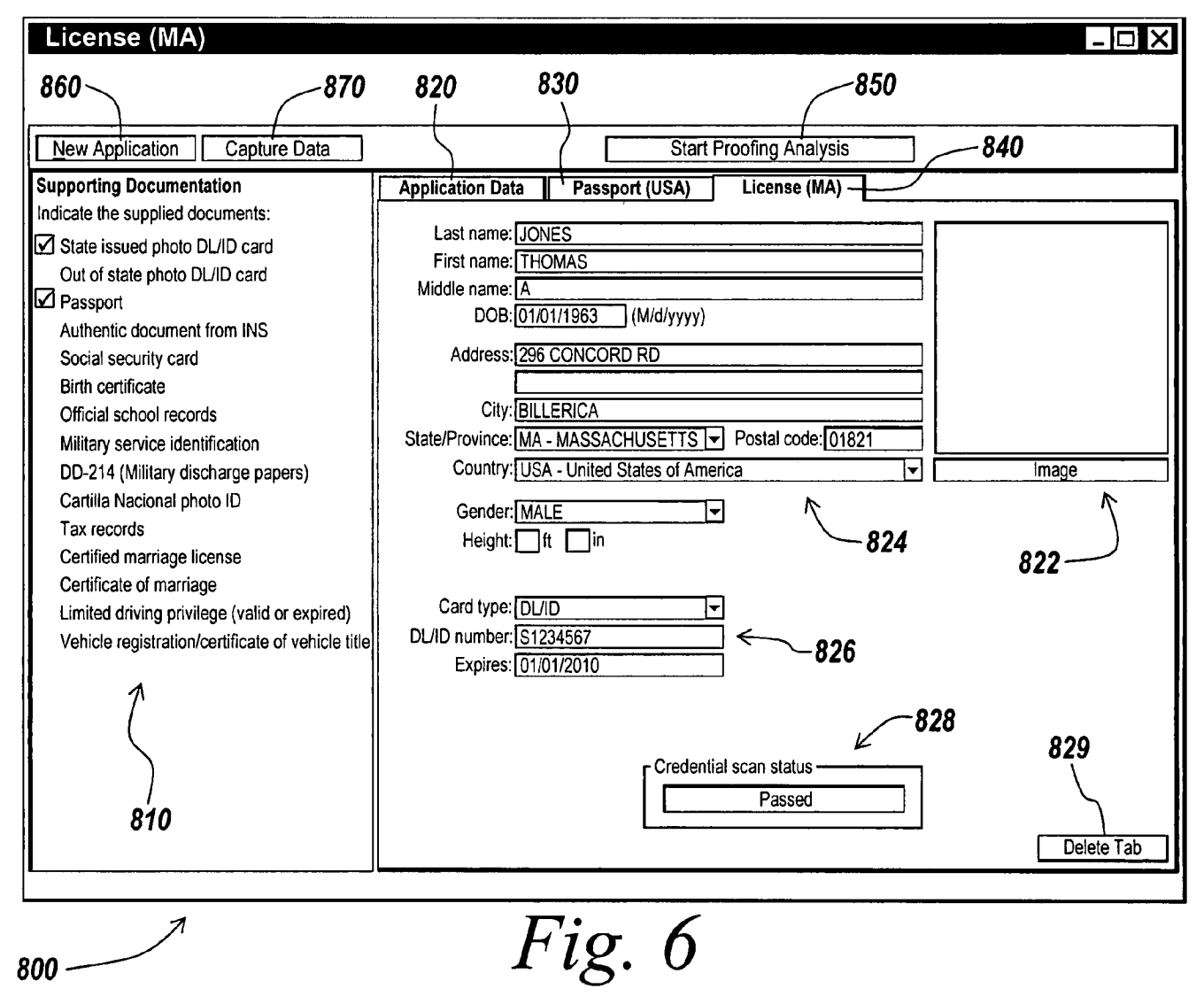

FIG. 6 depicts a screen shot of an exemplary user interface for use with a validation facility taught by the present invention.

FIG. 8 illustrates a screen shot of a result on a determination of the authenticity of an individual's identity in accordance with the teachings of the present invention.

FIG. 9 illustrates a screen shot depicting a result of the determination on the authenticity of an individual's identity in accordance with the teachings of the present invention.

BRIEF DESCRIPTION

Figure 1:
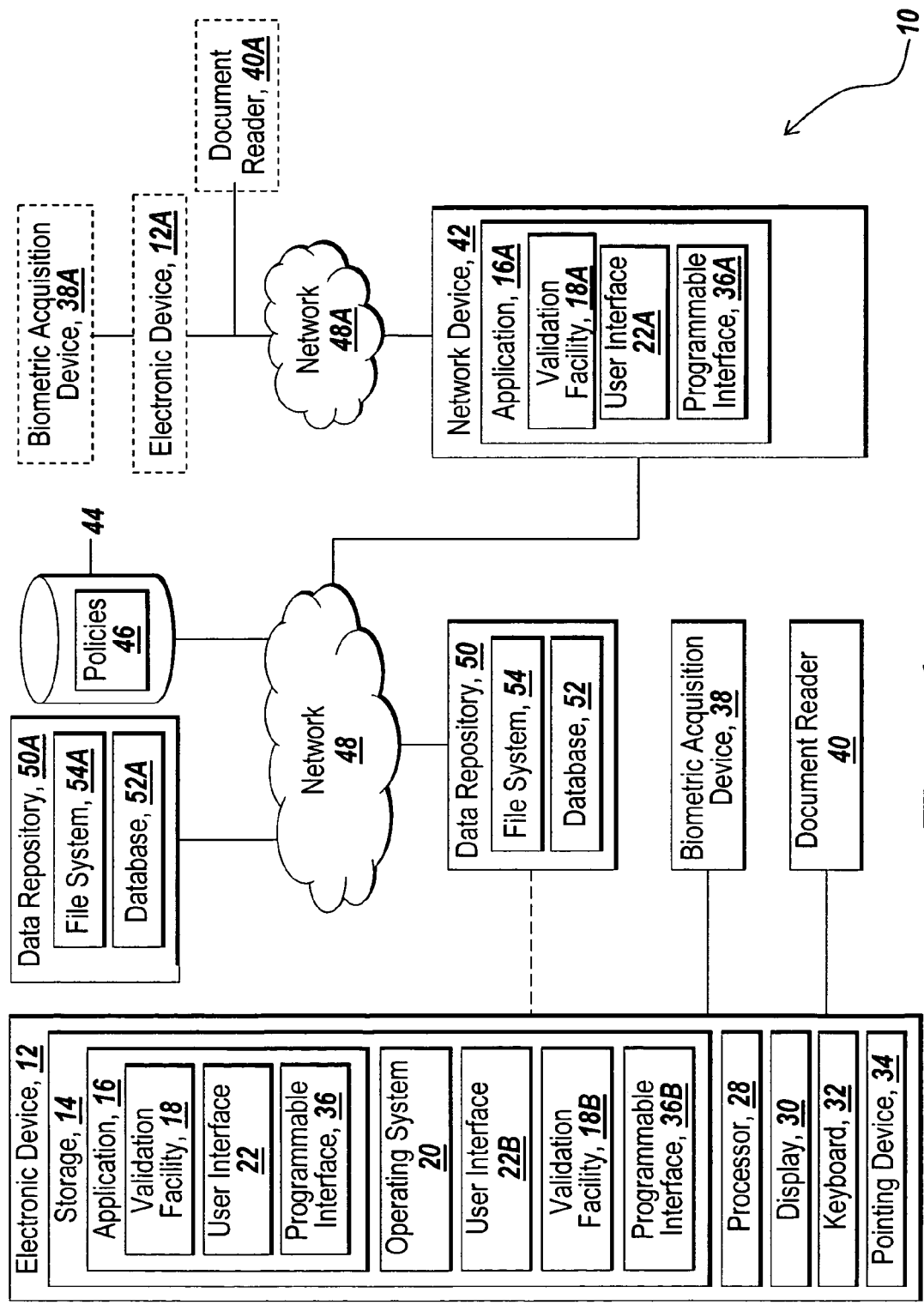
FIG. 1 illustrates an exemplary block diagram of a system in accordance with the teachings of the present invention.

The illustrative embodiment of the present invention provides a system and methods for determining that an individual or a document or a combination of an individual and a document or multiple documents are authentic. The system and methods of the illustrative embodiment of the present invention analyze biographic, demographic, and biometric data associated with an individual and determine based on the analysis if the identity of the individual is authentic and if any documents used in support of the claimed identity are authentic. The system and methods of the present invention provide an approach when validating the identity of the individual that accounts for missing or incomplete data retrieved from one or more databases or provided by the individual and further allows operator intervention to review the results of the determination and override the results if in the operator's judgment the discrepancy identified by the system and methods falls within an acceptable criteria.

Before continuing with the discussion below, it is helpful to first define a few terms as used throughout the specification.

As used herein the term "biometric acquisition device" refers to any device capable of acquiring or capturing biometric data of an individual and providing a representation of the biometric data. The biometric acquisition device can provide the representation of the biometric data either alone or in association with one or more software components, one or more hardware components, or both, as a set of brightness values of pixels, color values of pixels, luminance values of pixels, electrical charge values of pixels, a set of instructions or data for describing or characterizing the image or other biometric sense of the object as a binary representation, often referred to as a template, usually of some feature space relevant to the biometric and is suitable for comparing two such representations to produce a match score in some units, and the like. The biometric acquisition device can provide the representation of the biometric data in an analog format or a digital format and can provide a single representation or a series of representations spanning a number of biometric data captures or acquisitions.

As used herein, the term "document reader" refers to any device capable of reading data associated with a document in a machine readable format, a human readable format, or both. The machine readable format can include a two-dimensional barcode, an RF format, matrix code symbologies, magnetically encoded data, digitally encoded data, analog encoded data, and other features or symbols used for security purposes primarily visible under ultra-violet lighting conditions or infra-red lighting conditions. Examples of suitable document readers can include, but are not limited to magnetic stripe readers, bar-code readers, smartchip readers, scanners and document imaging systems.

As used herein, the term "authenticate" "validate" or "any derivatives thereof" refers to a process of determining that an individual or a document or a combination of the individual and the document or documents are authentic or valid.

As used herein, the terms "document" and "credential" refer to a document used to support an individual's identity or to define a privilege or privileges of the individual associated with the document or credential. The document or credential can take the physical form of a driver's license, a passport, a credit card, a debit card, a social security card, a workplace identification card, a military identification card, a smart card, and other like physical manifestations or can take a digital manifestation held in memory.

As used herein, the term "biometric" refers to the science and technology of measuring and statistically analyzing biological data. For example, the measuring and analyzing human body characteristics such as fingerprints, eye retinas and irises, voice patterns, facial patterns, and hand measurements such as a signature or hand geometry.

As used herein, the term "data repository" refers to a data structure suitable for holding data. Said suitable structures include, but are not limited to, a file system, a database and an associated database management system (DBMS), memory, and the like.

FIG. 1 illustrates an environment suitable for practicing an illustrative embodiment of the present invention. Proofing system 10 includes an electronic device 12, a network 48, such as the Internet or intranet, or other suitable network either wired, wireless, or a hybrid of wired and wireless, and a network device 42, such as a server, or other suitable network device. The electronic device 12 includes a processor 28 for executing various instructions and programs, and controlling various hardware and software components. The electronic device 12 also includes a display 30 for use in rendering textual and graphical images, a storage device 14 for storing various items such as an application 16, a validation facility 18B, an operating system 20, a user interface 22B, and a programmable interface 36B and other data, information and programs. As will be discussed below in more detail, the application 16 can include a validation facility 18, a user interface 22, and a programmable interface 36.

The electronic device 12 also includes a keyboard 32 and a pointing device 34, such as a mouse, trackball, or lightpen. The electronic device 12 further includes an interface that communicates with biometric acquisition device 38 and an interface that communicates with document reader 40. The electronic device 12 can communicate with the biometric acquisition device 38, the document reader 40, or both using a wired or wireless transmission medium.

For illustrative purposes, the application 16 is discussed below in terms of Viisage PROOF available from Viisage Technology, Inc. of Billerica, Mass. Nevertheless, those skilled in the art will appreciate that the application 16 may be another application, such as, but not limited to other applications for issuing a document or credential to support an individual's identification, in an application for performing a background check or issuing a security clearance and other like applications with a need to authenticate the identity of an individual.

The network device 42 coupled to the network 48 is configurable to include the validation facility 18A. In this manner, a number of users are able to access the validation facility 18A via the network 48 without the need to have each user running a local copy of the validation facility 18. Furthermore, the validation facility 18A located on the network device 42 allows a user of the electronic device 12 to access a biometric image acquisition device 38A associated with the second electronic device 12A or a document reader 40A associated with the second electronic device 12A via network 48A. In this manner, a biometric image acquisition device or remote document reader can be accessed and controlled using a set of commands from the application 16 by establishing and providing a communication channel between the local user and the remote biometric image acquisition device or remote document reader. The network device 42 also allows the application 16 to perform identity authentication in real-time or, if desired, to allow a user of the application 16 to collect identity information from a number of individuals and then perform in batch manner identity authentication either while the individuals await a result or by providing notification to the individuals of the results at a future point in time.

Proofing system 10 further includes a database 44 connected to the network 48 holding business policies 46 for use by the validation facility 18. The business policies 46 provide various rules and conditions for use by the validation facility 18 to determine which database to query, how to treat certain data in terms of weighting and other features such as how to handle missing or incomplete address information or name information. The use of the rules held by the business policies 46 in conjunction with the validation facility 18 are discussed below in more detail. Those skilled in the art will appreciate business policies 46 are configurable to meet various requirements determined by government regulations, client requests, or both and the business policies 46 can be divided into multiple categories for use by the validation facility 18 depending on the task the validation facility 18 is requested to perform. For example, if the validation facility 18 is tasked to authenticate an individual's identity to issue a passport the validation facility can use a first set of policies within the business policies 46 for such a task and use another set of policies when tasked to authenticate an ID to perform a commercial transaction such as a credit card or debit card.

Proofing system 10 can include a storage device 50 accessible directly by the electronic device 12 or indirectly via the network 48. Storage device 50 serves as a data repository and holds a database 52 or a file system 54. The database 52 or the file system 54 can be a third party database maintained by a data service and a third party file system maintained outside of the proofing system 10 or if desired can be part of or work in conjunction with "in-house" databases maintained by the operator or owner of the proofing system 10.

Proofing system 10 can further include a storage device 50A accessible directly by the electronic device 12 or indirectly via the network 48. Storage device 50A serves as a data repository and holds a database 52A or a file system 54A. The database 52A or the file system 54A can be a third party database maintained by a data service and a third party file system maintained outside of the proofing system 10 or if desired can be part of or work in conjunction with "in-house" databases maintained by the operator or owner of the proofing system 10. In this manner the proofing system 10 can provide access to multiple databases and file systems holding different types of data and data managed using different methodologies.

The databases 52 and 52A, the file systems 54 and 54A, or any combination thereof are considered data sources such as those provided by HotData from Group 1 Software of Lanham, Md., or Acxiom of Little Rock, Ark., or a government maintained watchlist or privately maintained watchlist or Aristotle of Washington D.C.

Application 16 provides the user of the electronic device with a user interface 22 defined by collection or set of functions, commands, controls, and methods for configuring identity authentication properties associated with the validation facility 18 and provides the programmable interface 36 for communicating with the database 44, the databases 52 and 52A and the file systems 54 and 54A, for communicating with the biometric acquisition device 38, the document reader 40, and other programs. The application 16 is extensible and configurable to add different input devices. In like manner, the user interface 22 is extensible and configurable to add or remove functions. The application 16 can be an object based programming language, a structured programming language or a hybrid programming language having object oriented (OO) properties and structured properties such as C#. For the ease of the discussion below, the illustrative embodiment of the present invention is discussed in accordance with the concepts and principles of classes in an object oriented framework. Nevertheless, those skilled in the art will recognize that the illustrative concepts discussed herein are applicable to other programming frameworks such as structured programming frameworks including C, Fortran and the like, or hybrid programming frameworks having OO properties and structured properties such as C#.

Further, for the ease of the discussion below, the illustrative embodiment of the present invention is discussed in terms of the validation facility 18, the user interface 22 and the programmable interface 36 being logically and physically located in the application 16. Nonetheless those skilled in the art will appreciate that any or all of the validation facility 18, the user interface 22, the programmable interface 36 can be physically or logically located outside of the application 16 within the electronic device 12 or outside of the electronic device 12, for example, the network device 42.

The validation facility 18 communicates with the user interface 22, the programmable interface 36, the interface to the biometric image acquisition device 38, and the interface to the document reader 40 to collect biometric, biographic, and demographic information associated with an individual to authenticate or proof an individual, a document, or a combination of an individual and a document. User interface 22 is defined by a set of functions, commands, methods, controls, and properties provided by the application 16 for interfacing with and interacting with the validation facility 18. The programmable interface 36 includes one or more software components to provide connectivity between the validation facility 18, the business policies 46, the databases 52 and 52A and the file systems 54 and 54A. The programmable interface 36 is able to manage the transfer of data between the validation facility 18, the business policies 46, the databases 52 and 52A, and the file systems 54 and 54A. The programmable interface 36 can operate performed tasks in a platform independent manner using the concept of a virtual machine to help avoid cross platform compatibility issues should the validation facility 18 be a first platform and the business policies 46 or the databases 52 and 52A or the file systems 54 and 54A be a second platform different from the first. For example, the electronic device 12 can be a Windows based platform and the storage device 52 can be a UNIX based platform. Those skilled in the art will appreciate that other suitable platforms exist, for example, DOS based platforms, Solaris based platforms, MAC based platforms, LINUX based platforms and the like.

The programmable interface 36 allows the validation facility 18 to access the business policies 46, the databases 52 and 52A either directly or indirectly, for example, through a database management system, and the file systems 54 and 54A regardless of cross platform compatibly issues that may exist between the various entities in the proofing system 10. In one embodiment of the present invention, the programmable interface 36 encodes access request statements in structured query language (SQL), and passes them to a database management system associated with either the database 52 or the database 52A to perform a desired method. Such methods can include, but are not limited to, creating tables, modifying tables, reading data, writing data, comparing data to earlier data versions, providing data integrity to avoid the use of or creation of corrupted data and other like methods. In another embodiment of the present invention, the programmable interface 36 abstracts file system dependencies associated with either the file system 54 or the file system 54A to provide data from the file system 54 or file system 54A in a format understandable by the validation facility 18. The validation facility 18 is able to interact with the business policies 46, the databases 52 and 52A and the file systems 54 and 54A with API calls to the programmable interface 36.

The programmable interface 36 can extend the features and functionality of the validation facility 18 allowing other software programs to "plug" into the validation facility 18 to provide additional functionality and features. In this manner, the validation facility 18 is extensible and configurable to support specific customer requirements or support other requirements such as a change in regulation regarding the privacy of personal information, a change in regulation regarding requirements for authenticating an individual, and the like.

The user interface 22 is extensible and configurable as a graphical user interface, a command line interface, or a menu driven interface to allow a user to interface with and interact with the validation facility 18. The validation facility 18 is responsible for analyzing the biometric and non-biometric data such as, biographic, and geographic data received via the biometric acquisition device 38, the document reader 40, the user interface 22 and compare that data with biometric and non-biometric data obtained from the database 52, the database 52A, the file system 54, the file system 54A, and other data sources, to provide a determination on the authenticity of the individuals claimed identity.

The validation facility 18 can use a number of methodologies and techniques to perform the analysis, compare the data sets, and provide the determination on the authenticity of the individual's claimed identity. That is, the validation facility 18 can use the business policies 46, a Bayesian inference network, a data mining base process, a neural network based process, a machine learning based process, or other selected statistical based processes to analyze the biometric and non-biometric data from the various data sources and determine the authenticity of a document from which certain data is provided, or the authenticity of the individual's claimed identity, or both. The validation facility 18 is further responsible for formatting the response data into a format understandable by the user of electronic device 12.

The validation facility 18 is extensible and configurable to use different combinations of documents and data sources to authenticate the documents and an individual's claimed identity. The architecture of the proofing system 10 provides at least two improvements over the conventional methodologies for authenticating a document or an individuals claimed identity. One improvement provided by the architecture of the proofing system 10 is the validation facility 18 allows the use of configurable authentication methodologies and strategies using both "in-house" data sources or services and third party data sources or services in a transparent and configurable way to improve the confidence level of a result on the determination on the validity of an individual's claimed identity, by fusing matching validation scores to perform a determination.

A second improvement provided by the architecture, operation and functionality of the proofing system 10 is the manner in which data from database queries is used. The data obtained from the databases is processed by the validation facility 18 to take into account the "noise" or errors in the databases. Therefore, the resulting validation scores tend to be resilient against such errors. Databases used for services such as the ones that provide address history data are known for having bad or missing data, but the validation facility 18 is configurable to take these data discrepancies such as missing data, misspelled data, and the like into account and where possible, take advantage of any redundancy in the data. A benefit of such an approach is the privacy of the individual being proofed receives greater protection as the improvement in analyzing and processing the data reduces the need for a user of the electronic device 12 to review a large amount of personal data when data conflicts arise.

The validation facility 18 allows for display and exposure to the user of the electronic device 12 relevant public data for manual review by the user when data conflicts do arise. Through the use of the business policies 44 the operator or owner of the proofing system 10 can define a line or distinction between public and private data for use by the validation facility 18 to further limit amount and type of data displayable to the user of the electronic device 12.

Figure 2:
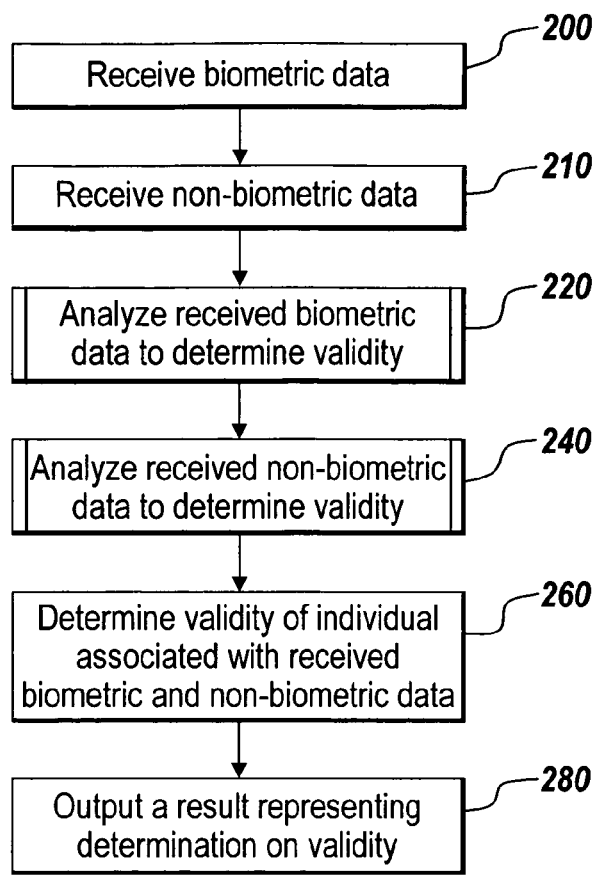
FIG. 2 illustrates a block flow diagram depicting steps taken to practice the teachings of the present invention.

FIG. 2 illustrates steps taken to practice an illustrative embodiment of the present invention. Those skilled in the art will appreciate the steps depicted are meant to facilitate explanation of the present invention and are not meant to limit the present invention to a particular ordering or sequence of steps. Further, those skilled in the art will appreciate that some depicted steps are combinable as a single step, and some steps may be performed sequentially or in parallel.

Figures 4, 5:
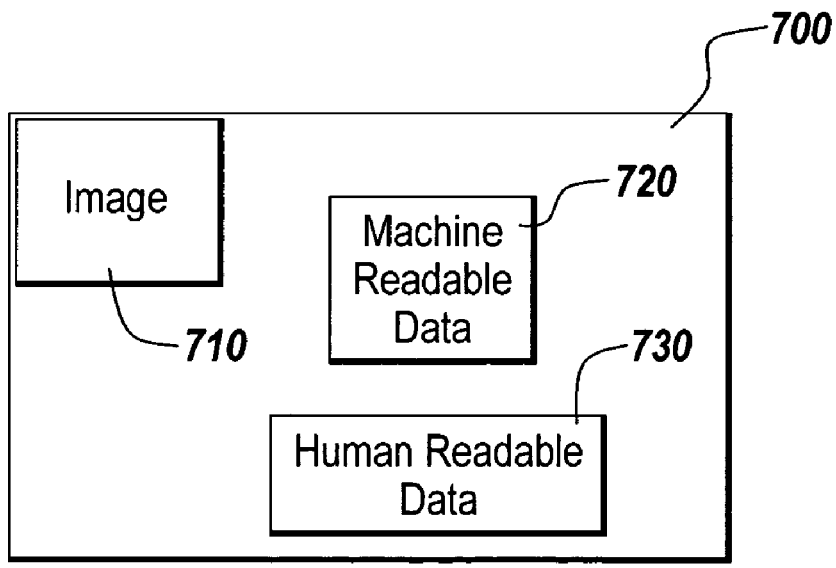
FIG. 4 illustrates exemplary probability tables for use in determining the validity of a claimed identity in accordance with the teachings of the present invention.
FIG. 5 illustrates an exemplary document suitable for use with the systems and methods taught by the present invention.

In step 200, the user of the electronic device 12 receives biometric data associated with an individual applying for a document, requesting access to a physical location or seeking to exercise his or her privileges, or perform some type of transaction. The user can receive the biometric data through the use of the biometric acquisition device 38 to acquire an image, a fingerprint, an iris or retina scan, a signature sample, or other biometric data. In addition, the user of the electronic device 12 can receive the biometric data via the document reader 40 from machine readable information held by a document presented to the user. FIG. 5 illustrates an exemplary document 700 that includes an image 710, machine readable data 720 and human readable data 730 suitable for use with the present invention. The machine readable data 720 can be digital data held by a smart chip, or digital data held by a memory device, or encoded on a magnetic strip, or encoded on a barcode or matrix symbology, or encoded in other machine readable formats. Those skilled in the art will appreciate that the document reader 40 is configurable to read the human readable data 730 and, in turn, convert the human readable data 730 into a machine readable format using, for example, an Optical Character Recognition (OCR) technique.

In step 210, the user of the electronic device 12 receives non-biometric data such as biographic and demographic information from the individual. Such non-biometric data can include the individual's first and last name, a middle initial or name, a date of birth, a current address including city, state and zip code, country, the individual's gender, height, social security number or other document or record identifier, and other like demographic or biographic information. The user of the electronic device 12 can receive the non-biometric data orally from the individual and enter such information through the user interface 22 for use by the validation facility 18. Alternatively, the user can provide the validation facility 18 with the non-biometric data through the use of the document reader 40. One suitable document reader 40 is available from Viisage Technology, Inc. of Billerica, Mass. and is disclosed in U.S. Pat. No. 6,269,169 the contents of which are incorporated herein by reference.

In step 220, the validation facility 18 utilizes the received biometric data to determine the validity of such data. The validation facility 18 analyzes the received biometric data by constructing a query requesting information from a data source such as any of the data repository database 52 and 52A or the file system 54 and 54A biometric related data associated with the individual whose identity is being authenticated and compares the biometric data received in step 200 with the biometric data received from one or more of the data repositories to determine the validity of the biometric data received in step 200. In step 240, the validation facility 18 sends a request via the programmable interface 36 to one or more of the data repositories to request non-biometric data associated with the individual presenting such information for authentication and, if configured to do so, uses the rules held by the business policies 44 to compare the non-biometric data received from the individual to the non-biometric data provided by the data repositories determine the validity of the non-biometric data presented by the individual, and, in turn, his or her identity.

In step 260, the validation facility 18 determines the validity of the individual's identity. In step 280, the validation facility 18 outputs a result representing the determination on the validity on the individuals claimed identity.

In operation, the validation facility 18 is able to analyze the biometric and non-biometric data presented by the individual and compare that data with biometric and non-biometric data obtained from various data sources to determine the validity of an individual's claimed identity across a number of data categories. The data categories can include, but are not limited to, the individual's name, date of birth, address, phone number, biometrics, watchlist, and an overall data category representing an aggregation of the results of the various data categories.

The validation facility 18, when receiving either the non-biometric data or the biometric data or both from an individual, can verify the validity of a document used to provide such information if the document is equipped with security features. Such security features can include images or marks primarily visible under certain lighting conditions, or other features such as a document ID readable and verifiable by the document reader 40. Further, the validation facility 18 is configurable to use intelligent rules, or policies from the policy database 46 to select which database to query based on the type of biometric or non-biometric data presented and based on the environment or context in which authentication of an individual's identity is required. For example, in the context of authenticating an individual's identity when the individual is purchasing an airplane ticket or seeking to board an airplane the validation facility 18 can perform a watchlist query. Further, the validation facility 18 can apply different weighting to data received from various data sources based on the data sources used. In this manner, data sources known as providing highly reliable data can be afforded a higher weight or confidence level than data sources known to provide less reliable data.

The validation facility 18 can also preprocess the data received from the biometric acquisition device 38, the document reader 40, and the user interface 22 before or after requesting information held by one or more data sources. In this manner, the validation facility 18 can review the received non-biometric data for inconsistencies or errors such as the misspelling of a word or the use of an abbreviated word or examine the data for known changes to certain types of data, for example should the U.S. Postal Service revise zip codes for certain cities and towns and the like. The validation facility 18 is capable of knowing and accounting for such changes. Additionally, the validation facility 18 can parse and examine the received data and based on prior use of such data or use of similar data determine or apply prior confidence level weights to the data based on historical knowledge. The validation facility 18 can also filter the data and send additional requests to the database 52 and 52A or the file systems 54 and 54A to analyze data to identify patterns or relationships.

As just discussed, the validation facility 18, for each data category can calculate a validation confidence score across the available in-house and third party data sources and services. In this manner, the validation facility 18 weights the various data categories according to data source with data sources known to have more reliable data receiving a weighting different from those data sources having less reliable data. In this manner, a user of the system or the business policies 46 can define based on the task being performed or the user of the system to use certain data sources instead of other data sources. The validation score combines automatic matching decisions with statistical weights, such as trust levels of each data source, to obtain a confidence measure for each data category.

Once the validation facility 18 has analyzed the results of comparing the biometric and non-biometric data received from the individual with the biometric and non-biometric data received from the various other data sources, the validation facility 18 determines a validation score for each data category and combines or aggregates the validation scores for each data category to determine an overall result to indicate if the individual's claimed identity is authentic. In this manner, the validation facility 18, by applying various validation scores across the various data categories, can improve the confidence level and the final determination as to the authenticity of the individual's claimed identity. For example, if the validation facility 18 determines that the individual's name and address passes the analysis, but the biometric analysis fails, the validation facility 18 can apply a higher weighting to the biometric data category and determine that the individual's claimed identity is not valid. Likewise, if the validation facility 18 determines the biometric data category passes along with the data categories of name and address, but the telephone category fails the validation facility 18 can determine that the individual's claimed identity is authentic.

In operation, the validation facility 18 can be configured to use different combinations of documents (i.e., credentials) and background checking services. For example, the authentication of the individual can be configured into multiple stages. In a first stage, the presented documents are examined to determine their authenticity and all useful data is extracted from them. In turn, or at the same time, biometric data is captured from the individual by the biometric acquisition device 38 and is compared against biometric data extracted from the documents or a data repository holding biometric data and, if desired, compared against selected data such as data from one or more watchlist. Any failure or discrepancy of the biometric analysis or the document analysis can be reviewed by the operator before proceeding further.

In a second stage, the validation facility 18 uses the data entered via the user interface 22, the data acquired using the biometric acquisition device 38, and the data acquired from the document reader 40 to request data from one or more data services and then validate the data received from the individual using the data returned from the data sources. The validation facility 18 can minimize the number of requests to those data sources to increase processing speed, and reduce cost while providing an acceptable level of confidence in the validation result. Those skilled in the art will appreciate that the acceptable level of confidence can vary depending on the context, situation or task associated with authenticating the individual's identity. For example, the acceptance level can vary based on whether the individual is being issued an identity document or whether the individual is trying to gain access to a privilege or can vary depending on other conditions such as increased or decreased security levels. The validation facility 18 uses the data obtained via the user interface 22 and the document reader 40 to request like data from the databases 52 and 52A or the file systems 54 and 54A and filters the response data and determines a match between the filtered response data to the data received from the individual.

The validation facility 18 in one illustrative embodiment of the present invention is configured to include or use a Bayesian inference network to validate the non-biometric data received from the data sources to account for errors in the data provided by the databases 52 and 52A or the file systems 54 and 54A. The Bayesian inference network or networks are adaptable to changes in the non-biometric data received by the validation facility 18 via the user interface 22 and the document reader 40, and also encodes the confidence or trust levels of the various data services or databases used for matching with the data presented by the individual.

For example, the validation facility 18 when using the Bayesian inference network can authenticate an individual's address by treating the address as a data validation category with a number of data validation sub-categories. The individual's address consists of a number of fields or data validation sub-categories, such as city, street, number, and apartment if applicable, and can include other fields such as country, state and county, amongst other fields depending on the location of the individual's residence. The validation facility 18 does not consider the individual's address valid if any part of the address is determined to be invalid. As such, the validation facility 18 can break the address validation category into a series of sub-categories which consist of each of the address fields. For each validation field and subfield is an associated validation state and each validation state can have a plurality of states, such as true, false, missing, incomplete, and the like.

The Bayesian inference network suitable for use as part of the validation facility 18 can take a number of configurations. One such configuration which reduces the complexity of the Bayesian inference network includes variables which represent "partial" validation of the individual's address. This results in a dynamic network which allows calculation of the inferred probabilities in a sequential fashion when a Markov approximation is used. The benefit of using the partial validation of the address (selecting various address fields for validation and validating each individual field such as determining if the city field matches, if the street field matches, if the number field matches, and if the apartment field matches) results in the parameters of the network contained in the probability tables corresponding to the network nodes having intuitive meaning which allows the validation facility 18 to bypass an extensive training procedure by estimating the parameters from a false acceptant rate (FAR) and false rejection rate (FRR) of the databases being used as data sources to validate the biometric and non-biometric data received from the individual.

Figure 3:
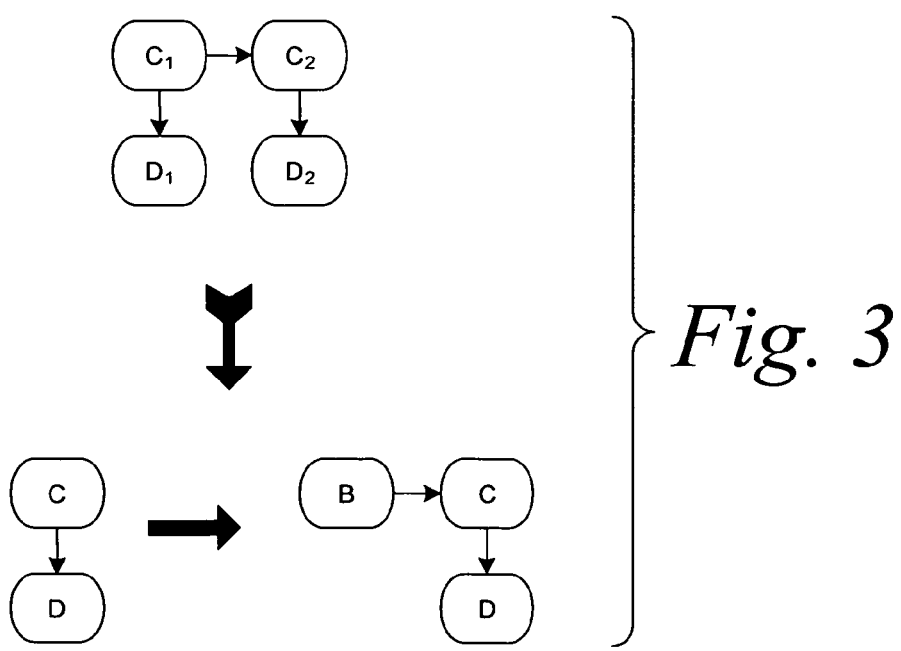
FIG. 3 depicts an exemplary diagram illustrating an approach to determine the validity of a claimed identity in accordance with the teachings of the present invention.

FIG. 3 illustrates one example of the Bayesian inference network suitable for use in conjunction with the validation facility 18. Those skilled in the art will appreciate the diagram represented in FIG. 3 is a simplified example having only two stages to facilitate explanation of the Bayesian inference network suitable for use with the validation facility 18. Further, those skilled in the art will appreciate the diagram in FIG. 3 is not meant to limit the Bayesian inference network suitable for use with the validation facility 18 and can include more than two stages to meet the needs or requirements of a particular implementation of the validation facility 18.

As illustrated, the final probability of a data sub-category is represented by $P(C2|D1,D2)$ and is calculated in this example in two steps. First, based on the result of measurement of the node D1, the conditional probability $P(C1|D1)$ is calculated as if there are only two nodes in the system. Then, that result is used along with the measurement of D2 to calculate the final result, using the three node structure shown at the bottom right of the diagram in FIG. 3 and taking $P(C1|D1)=P(B)$ by using a Markov approximation.

FIG. 4 illustrates the probability tables used in the calculation discussed above in FIG. 3 and can be parameterized as shown in Table 1 and Table 2. Table 1 represents the conditional probability $P(D|C)$ which represents the reliability of the state of the detection variable given by D in predicting the state of the cause C. The values of the variables Yt and Yf are therefore directly related to the false rejection rate and false acceptance rate of the matching process. Using the address validation example, it is assumed that those errors are due to the corruption of the data from the selected databases, not the matching process itself, but the principle still applies.

Table 2 represents the conditional probability $P(C|Z)$ which represents a difference process. The assumption is that the state Z is a subset of the state C. Therefore, in this case, if Z is false, C must also be false, explaining the bottom row of Table 2. The top row of Table 2 is parameterized by the variable K, which represents the fraction of information of the variable C, which is contained in the variable Z.

Those skilled in the art will recognize that some missing information is not crucial to the validity of the entire chain. For example, in the address validation example, some of the fields, such as the apartment number, should not be considered a critical piece of information. To take that fact into account properly requires adjustments to the corresponding probability table variables, most likely K and possibly X and Y as well. One possible solution is to bring the value of K closer to 1 than is the case for the other fields, although other solutions are possible.

Other possibilities for configuring the validation facility 18 can include in addition to the Bayesian inference network or in place of the Bayesian inference network the use of data driven business rules, or policies held in the policies database 46. The business policies provide at least configuration settings that guide the operation and decision making ability of the validation facility 18. The business policies 44 can be broken down into a number of categories, including, but not limited to, input rules, matching rules, and output rules. The input rules can provide information or combinations of information that are required by a particular customer or user of the proofing system 10. The matching rules provide information or combinations of information as to how the validation facility 18 compares and matches data received from the individual and data received from the database 52, database 52A, the file system 54 or the file system 54A. The output rules can include information or combinations of information that define if incomplete or insufficient data should trigger a failure in a data category or if the incomplete or insufficient data be ignored, and under what conditions and the like.

Examples of input rules can include, but are not limited to, a situation in which a driver's license is given as a document by an individual. In such an instance a rule held by the policies database 46 can indicate to the validation facility 18 that the Aristotle on-line data service should be used. Another exemplary input rule held by the policies database 46 can identify the required data fields for the non-biometric data received from the individual. For example, one user of the proofing system 10 may require a social security number field while another user considers the social security field optional. If a data field is optional, data provided in that field will be used by the validation facility 18 if provided but the absence of data in that field will not be considered a data deficiency or incomplete data by the validation facility 18. Likewise, if the particular data field is required, and no data or the wrong type of data is found in the field by the validation facility 18, the validation facility 18 can conclude the data is invalid, incomplete, or failed in that particular data category.

The matching rules can identify to the validation facility 18 how comparisons between data received from the individual is compared with data requested and received from the data sources. That is, the matching rules can define any combination of data categories that require exact, tolerant or close matches to determine the authenticity of the data in a particular data field. Examples of matching rules include whether "John Smith" is an acceptable match with "John Q. Smith", or whether "John Smith, Jr." should be considered a match with "John Q. Smith". Additional matching rules can define what the biometric matching thresholds are and whether all biometrics have to pass or only a subset of biometric data must pass. Further, the data matching rules can be different for different data categories, for example, rules held by the policies database 46 can define the name matching data category must be exact when comparing names between documents and on-line data sources, however, name matching might be more flexible and more tolerant of missing data elements, such as a middle name or initial when matching against a watchlist.

Output rules held by the policies database 46 can define whether incomplete or insufficient data should trigger a failure in a data category or whether incomplete or insufficient data should be ignored in a data category. The policies can also define under what conditions a failure should be triggered or incomplete or if insufficient data should be ignored. For example, if the Acxiom on-line data service has no data for a particular combination of name and address, should this be treated as a failure or when individual data categories generate an insufficient or incomplete result, should these individual data categories be ignored when generating a final recommendation or should a failure recommendation be generated based on these insufficient or incomplete results in the data categories.

FIG. 5 illustrates an exemplary document 700 suitable for use with the proofing system 10. The document 700 can include an image 710 which can be a facial image or other image such as a representation of a fingerprint. The document 700 also includes machine readable data 720 and human readable data 730 for use by the proofing system 10 and an operator of the proofing system 10. Examples of the document 700 include, but are not limited to a driver's license, a passport, a work place ID, a military ID, a credit card, a debit card, a charge card, a smart card, and other like documents.

FIGS. 6 through 9 show various screen shots of the user interface 22 and will be used to illustrate an illustrative embodiment of the validation facility 18 from a user's perspective. Those skilled in the art will recognize that the user interface screen depicted in FIGS. 6 through 9 are merely illustrative and may be depicted in a number of suitable manners. Furthermore, those skilled in the art will appreciate the user interface 22 is configurable and extensible to display information based on a configuration of the validation facility 18. Upon initialization of the user interface 22 and the validation facility 18, or at any time thereafter, the main window 800 (FIG. 6) is rendered on the display 30. The main window 800 controls the collection or receipt of biometric and non-biometric data from an individual to authenticate that individual's claimed identity. The main window 800 organizes the received data and document type supported by the validation facility 18. The main window 800 provides the user or operator with a series of graphical user interface objects such as one or more tab windows such as application data window 820, passport data window 830, and license data window 840.

Other graphical user interface objects provided by the window 800 include button "start proofing analysis" 850 selectable by the user to initiate analysis of data held in the various fields of the various tab windows, button "new application" 860 to initiate a new application and button "capture data" 870 to control the biometric acquisition device 38 and the document reader 40 and the capture of data from other data sources such as databases 52 and 52A and file systems 54 and 54A. The main window 800 also provides a text box 810 which lists the types of documents supported by the validation facility 18. The text box 810 can include graphical user interface objects such as click boxes or check boxes or buttons selectable by the user to indicate the type of document or documents presented by the individual is support of his or her claimed identity.

Each tabbed window element of the main window 800 can include a number of graphical user interface objects such as text boxes, buttons, pull-down menus, radio buttons and the like. For example, tabbed window 820 includes a number of text boxes 824 and 826 configured to receive alphanumeric data and include list boxes, with or without scroll bars, for use in displaying data acquired via the document reader 40 or the biometric acquisition device 38 or data entered using the keyboard 32, or the pointing device 34 or the databases 52 and 52A or the file systems 54 and 54A. Tabbed window element 820 further includes one or more fields providing an indication of whether the document reader 40 successfully read the information in the document and if the biometric acquisition device 38 successfully acquired the biometric data. One such field is shown in a text box 828. The tabbed window element 820 further includes an image window 822 for displaying an image such as a facial image or a representation of a fingerprint or other suitable image data used for identification purposes. Tabbed window element 820 also includes a button "delete tab" 829 selectable by the user to delete some or all of the data displayed in the various text boxes of the tabbed window element 820.

Those skilled in the art will appreciate the various graphical user interface elements depicted in FIGS. 6-9 are configurable to meet an implementation of the present invention. For example, the "Delete Tab" button is configurable to appear only on tabbed window elements that contain data either supplied by the individual or requested from one of the data sources. In one embodiment of the present invention the tabbed application data window 820 does not include the "delete button" because the tabbed application data window 820 is considered the fundamental tab which represents the claimed identity of the individual.

Figure 7:
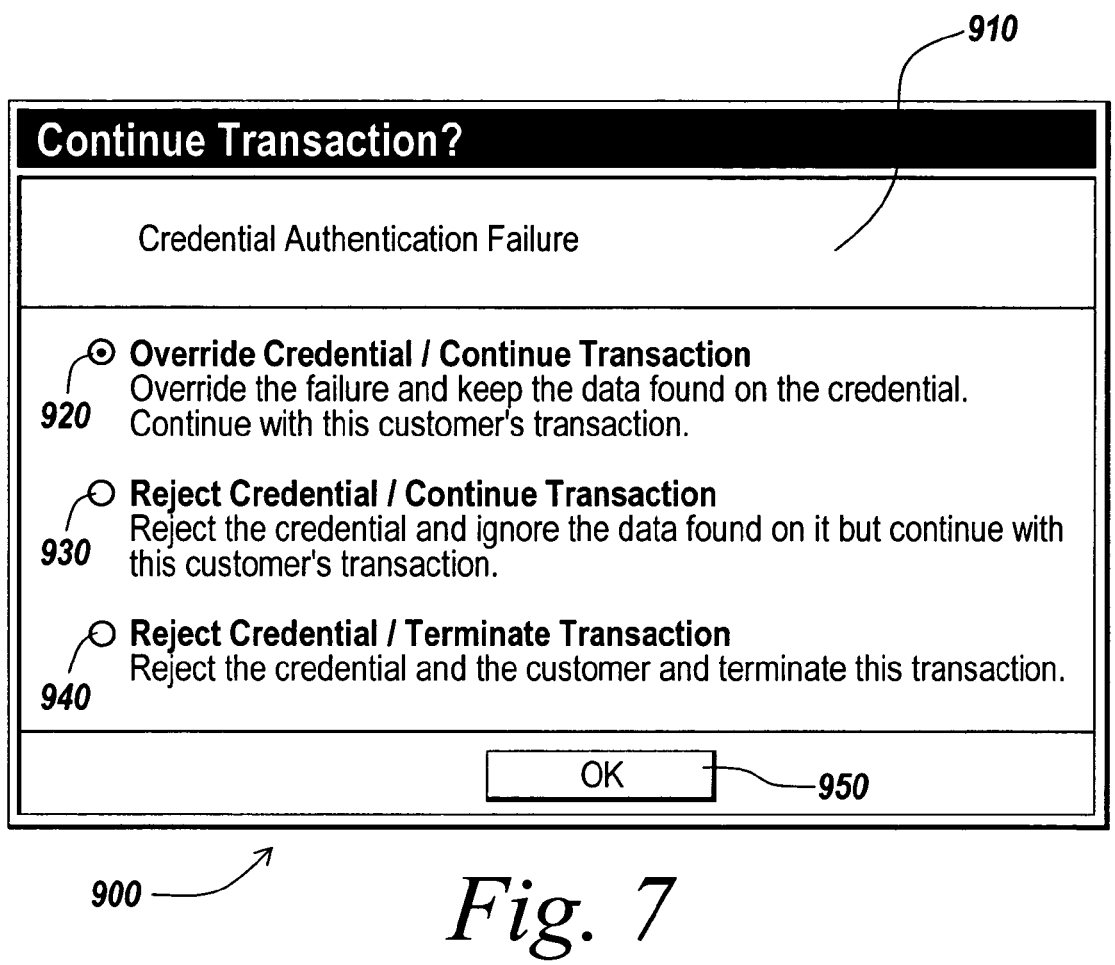
FIG. 7 is a screen shot depicting a result of the determination on the authentication of a document in accordance with the teachings of the present invention.

FIG. 7 depicts a credential authentication failure window 910, which provides the user with a variety of buttons and textual narrative to determine how to proceed with the authentication process for the individual. The credential failure represented by the credential authentication failure window 910 indicates a result of the analysis of a credential and the determination that the credential is invalid can be performed by the document reader 40, the validation facility 18, 18A or 18B, or a combination of the document reader 40 and the validation facility 18, 18A or 18B. The credential authentication failure window 910 provides the user of the electronic device 12 with a button 920 to override the credential failure and continue the transaction, a button 930 to reject the document and ignore the data found on it and continue with the authentication process, and a button 940 to reject the document and terminate the authentication process. Once the user selects one of the buttons 920, 930 or 940, the user can select the "OK" button 950 to indicate his or her selection to the validation facility 18. The credential authentication failure window 910 illustrates the adaptability of the validation facility 18 by providing an opportunity for a user to review results of an analysis performed to determine the authenticity of presented data. In this manner, the proofing system 10 combines both user input and computer based validation processing to determine the authenticity of an individual's claimed identity. A credential failure can occur when a document is expired, tampered with, or is fraudulent.

FIG. 8 depicts a proofing analysis results window 1000 which provides the user with a determination on the individual's claimed identity as determined by the validation facility 18. The validation facility 18 can provide a result for each determination in each data category along with a result of the determination of the authenticity of the individual's claimed identity. The results window 1000 includes a proofing category list 1010 and a corresponding results list 1020. Together the proofing category list 1010 and the results list 1020 identify some or all of the data categories used by the validation facility 18 to determine the authenticity of the individual's claimed identity. Each displayed data category is associated with a "review" button 1030A through 1030F which allows the user to select a data category and review in greater detail the results of the analysis to determine the authenticity of data for the selected category.

The proofing analysis results window 1000 provides an overall results box 1040 to indicate a result of an overall determination by the validation facility 18 on an individual's claimed identity. The result box 1040 includes a "done" button 1050 selectable by the user to indicate to the validation facility 18 when the user wishes to terminate or end the authentication session for the selected individual. The "review" buttons 1030A-1030F also allow the user to review the data and override the determination of the validation facility 18 in a particular data category. The validation facility 18 can output a result of the determination in each data category and in the overall category to represent a failed determination, a passed determination, an insufficient data determination or incomplete data determination. A result indicating insufficient data indicates that there was not enough data available for matching to determine either a pass or a fail for the data category. At least two sources of data are needed for each category to have sufficient data to be used in the analysis. A result of incomplete indicates that one of the data sources, such as the database 52 or 52A or the file system 54 or 54A did not return any data associated with the query for that data source, which is based on the data from window elements 820, 830 or 840. Although there were no other failures detected for this category the data category does not qualify for a pass status because a third party service was used and no data was returned for that individual. Determination of the pass/fail criteria for the various data categories can be defined and controlled by the business policies 46.

If conflicts are detected during the authentication analysis, the overall result is represented in result box 1040 as failed. The failed representation indicates the validation facility 18 determined there was a conflict between the data received from the individual and the data obtained from a request to a database or file system. The validation facility 18 can also output a failed result if the validation facility 18 determines data obtained from the document reader 40 does not match what was entered in the window 800. The validation facility 18 can also determine the individual's claimed identity is invalid because the document reader 40 inaccurately scanned the document information, the information returned by one of the data sources was flagged as suspect or did not match the data in main window 800, the biometrics data did not match, or that certain data did not match data in a watchlist. The validation facility 18 can also represent the result of the determination in a number of graphical manners including text displays, image displays using various colors and graphical features or a combination of text and graphical features to represent a result on a determination of the authenticity of individual's identity.

FIG. 9 depicts the proofing results window 1000 after the user selects the review button 1030A and overrides the determination of the validation facility 18 in the related data category. Examples where the user would override such a determination include, but are not limited to changes in last name due to marriage or divorce, abbreviations used for the first or last names, nicknames used instead of given or formal names such as Tom instead of Thomas and the like. In turn, by overriding the determination by the validation facility 18 in the selected data category the validation facility 18 updates the overall result window 1040 with a pass representation to indicate the individual's claimed identity is authentic.

Those skilled in the art will appreciate the validation facility 18 and the user interface 22 can include other graphical user interface objects for selection and use by the user. One such graphical user interface object can include a button or the like selectable by the user to access a log to review the transaction history to determine when a user override has taken place and under what conditions. This provides an audit trail for use in determining if the override features have been properly used by one or more users. Furthermore, those skilled in the art will recognize that the various graphical user interface elements discussed above in FIGS. 6 through 9 are merely illustrative and are not meant to limit the present invention to the use of those graphical user interface elements. For example, push buttons or radio buttons can be used in place of check boxes or dialog boxes without a scrollable feature can include a scroll box or elevator.

While the present invention has been described with reference to an illustrative embodiment thereof, one skilled in the art will appreciate that there are changes in form and detail that may be made without departing from the intended scope of the present invention as defined in the pending claims. For example, the validation facility 18 can be adapted and configured to work with a large number of applications for use in identity verification of an individual or an object such a presented document or card. Furthermore, the user interface 22 is configurable to automatically populate like data fields in the various tabbed window elements once one field is populated with data. This allows a measure of efficiency for the user or operator because they do not have to re-enter or retype the data into the various like data fields on the various tabbed window elements. Moreover, those skilled in the art will appreciate that all of the user interface windows depicted in FIGS. 6-9 can be built using graphical program components, such as those found in Microsoft Visual Basic, Visual C++, or C#.

What is claimed is:

1. A method for performing identity verification of an individual, the method comprising:
   receiving an identification document from the individual;
   receiving an indication of an environment or setting in which the identity verification is to be performed;
   reading machine readable identification features of the identification document;
   accessing a plurality of different data sources based on the machine readable identification features of the identification document and based on the environment or setting in which the identity verification is to be performed;
   receiving geographic data and biographic data accessed from the plurality of different data sources;

selecting an authentication methodology to perform an analysis of the identification document and the received data based on one or more inferences made based on the environment or setting in which the identity verification is to be performed;

using the selected authentication methodology to analyze the identification document and the received data to generate a result providing an overridable determination of the individual's identity;

combining validation scores of the analysis performed by the authentication methodology based on the plurality of different data sources to improve the confidence level of the result; and automatically representing the result of analyzing the identification document and the received data with one or more indicators.

2. The method of claim 1, further comprising:
determining if the data received from one of the plurality of data sources is valid before analyzing the received data to verify the identity of the individual.

3. The method of claim 2, wherein the data received from the plurality of data sources includes biometric data.

4. The method of claim 2, wherein the data received from the plurality of data sources include one or more of demographic data, biographic data, transaction data, itinerary data, watchlist data for identifying undesirable individuals, data from data warehouses, or data from data services.

5. The method of claim 1, further comprising:
determining if the document is a genuine document, a counterfeit document, or a tampered document.

6. The method of claim 1, further comprising:
constructing a query to extract the data from one of the plurality of data sources.

7. The method of claim 1, wherein the selecting of the authentication methodology is based on a type of the identification document.

8. The method of claim 1, wherein the received data includes bad, missing, or conflicting data, and wherein the method further comprises:
automatically taking the bad, missing, or conflicting data into account during the analysis of the received data without need for user intervention.

9. A system for validating one or more objects, the system comprising:
a first computational device to receive information from the one or more objects, the information received including biometric data and non-biometric data;
a validation facility to validate the information received from the one or more objects, the validation facility configured to:
receive an indication of an environment or setting in which the validation is to be performed;
access a plurality of different data sources based on the information received and based on the environment or setting in which the validation is to be performed;
receive data accessed from the plurality of different data sources;
select a validation methodology to perform an analysis of the information received from the one or more objects, the validation methodology selected based on one or more inferences made based on the environment or setting in which the validation is to be performed;
use the selected validation methodology to analyze the information received from the one or more objects based on the data received from the plurality of different data sources;
combine validation scores of the analysis performed using the selected validation method based on the plurality of data sources to improve the confidence level of a result of the analysis; and
provide a plurality of outputs based on the analysis representing a determination on the validity of the one or more objects, each of the plurality of outputs having at least two states.

10. The system of claim 9, further comprising:
an interface configured to receive a request for data from the validation facility and forward the request in a format understandable by a data source identified in the request.

11. The system of claim 9, wherein the validation facility is extensible to add or remove components to add or remove functionality from the validation facility.

12. The system of claim 9, further comprising:
a storage device holding business rules that define what data conditions the validation facility should accept, what data conditions the validation facility should reject, and what data conditions the validation facility should take an action on to notify a party interested in validating the one or more objects.

13. The system of claim 9, further comprising:
an image acquisition apparatus.

14. The system of claim 9, further comprising:
a document reader apparatus.

15. The system of claim 9, wherein the one or more objects comprise an individual.

16. The system of claim 9, further comprising:
a second computational device to receive information from the one or more Objects, the information received includes biometric and non-biometric data.

17. The system of claim 16, wherein the second computational device comprises a server and the second computational device manages operation of the validation facility.

18. The system of claim 9, further comprising:
a user interface configured to allow a user to interact with the validation facility.

19. The system of claim 18, wherein the user interface is extensible to add or remove components to add or remove features that allow the user to interact with the validation facility.

20. The system of claim 18, wherein the user interface is configurable to enable communication between the user and the validation facility.

21. The system of claim 9, wherein the validation facility is configurable for a particular user preference.

22. A non-transitory computer readable storage medium holding computer readable instructions for performing a method to verify the identity of an individual, the method comprising:
reading machine readable identification features of an identification document received from the individual;
receiving an indication of an environment or setting in which the identity verification is to be performed;
accessing a plurality of different data sources based on the machine readable identification features of the identification document and based on the environment or setting in which the identity verification is to be performed;
receiving geographic data and biographic data accessed from the plurality of different data sources;
selecting an authentication methodology to perform an analysis of the identification document and the received data based on one or more inferences made based on the environment or setting in which the identity verification is to be performed;

using the selected authentication methodology to analyze the identification document and the received data to generate a result providing an overridable determination of the individual's identity;

combining validation scores of the analysis performed by the authentication methodology based on the plurality of different data sources to improve the confidence level of the result; and automatically representing the result of analyzing the identification document and the received data with one or more indicators.

23. The medium of claim 22, further comprising:
determining if the data received from one of the plurality of data sources is valid before analyzing the received data to verify the identity of the individual.

24. The medium of claim 23, wherein the data received from the plurality of data sources includes biometric data.

25. The medium of claim 23, wherein the data received from the plurality of data sources include one or more of demographic data, biographic data, transaction data, itinerary data, watchlist data for identifying undesirable individuals, data from data warehouses, and data from data services.

26. The medium of claim 22, further comprising:
determining if the document is a genuine document, a counterfeit document, or a tampered document.

27. The medium of claim 22, further comprising:
constructing a query to extract the data from one of the plurality of data sources.

* * * * *